(12) United States Patent
Mori et al.

(10) Patent No.: US 7,483,920 B2
(45) Date of Patent: *Jan. 27, 2009

(54) DATABASE MANAGEMENT SYSTEM, DATABASE MANAGEMENT METHOD, AND PROGRAM

(75) Inventors: Shigeko Mori, Yamato (JP); Toshikazu Takahashi, Yokohama (JP); Ichiroh Teshima, Chofu (JP)

(73) Assignee: International Business Machines Corporation, Armonk, NY (US)

( * ) Notice: Subject to any disclaimer, the term of this patent is extended or adjusted under 35 U.S.C. 154(b) by 464 days.

This patent is subject to a terminal disclaimer.

(21) Appl. No.: 11/268,910

(22) Filed: Nov. 8, 2005

(65) Prior Publication Data

US 2006/0106781 A1 May 18, 2006

(30) Foreign Application Priority Data

Nov. 12, 2004 (JP) ............................. 2004-329661

(51) Int. Cl.
*G06F 17/30* (2006.01)
(52) U.S. Cl. .......................................... 707/200; 707/8
(58) Field of Classification Search .................. 707/3, 707/6, 100, 102, 200, 201, 205, 8, 204
See application file for complete search history.

(56) References Cited

U.S. PATENT DOCUMENTS

| 6,430,626 | B1 * | 8/2002 | Witkowski et al. ........... 709/249 |
| 7,107,258 | B2 * | 9/2006 | Cheng et al. .................... 707/3 |
| 2004/0148284 | A1 * | 7/2004 | Baker .............................. 707/6 |
| 2005/0223043 | A1 * | 10/2005 | Randal et al. ................ 707/200 |

FOREIGN PATENT DOCUMENTS

| JP | 8249222 A2 | 9/1996 |
| JP | 2001142765 A | 5/2001 |

\* cited by examiner

*Primary Examiner*—Debbie M Le
*Assistant Examiner*—Md. I Uddin
(74) *Attorney, Agent, or Firm*—Shimokaji & Associates, PC

(57) ABSTRACT

A database management system for determining consistency in a hierarchical database sequentially reads pointers of a plurality of segment data, generates an address hash value, which is a hash value of retention addresses of the segment data having been read, generates a pointer hash value, which is a hash value of the pointers included in the segment data having been read, corrects the address hash value, when the contents of the address already read is updated, based a retention address of segment data added or deleted by the update, corrects the pointer hash value based on each pointer changed by the update, and determines that the hierarchical database is consistent if the corrected address hash value coincides with the corrected pointer hash value.

6 Claims, 11 Drawing Sheets

| RETENTION ADDRESS RECORDING AREA 400 | PRE-CHANGE POINTER RECORDING AREA 410 | POST-CHANGE POINTER RECORDING AREA 420 |
|---|---|---|
| ∫ | ∫ | ∫ |
| 1000 | 1100 | 1200 |
| 1200 | NULL | 1100 |
| ∫ | ∫ | ∫ |
| 2000 | 2100 | 2200 |
| 2100 | 2200 | NULL |
| ∫ | ∫ | ∫ |

DATABASE MANAGEMENT SYSTEM, DATABASE MANAGEMENT METHOD, AND PROGRAM

CROSS REFERENCE TO RELATED APPLICATION

This application claims the priority of Application No. 2004-329661, filed Nov. 12, 2004, in Japan, the entire contents of which is incorporated herein by reference.

FIELD OF THE INVENTION

The present invention relates to a databases, and more particularly to a database management system, a database management method, and program for determining consistency in a database.

BACKGROUND OF THE INVENTION

To determine the database consistency in a hierarchical database, it is typically necessary to calculate a sum value of retention addresses of respective segment data included in the database and a sum value of pointers included in the database and to determine whether there is a match between the sum values. If a database is updated during the time from starting the readout of one pointer until completing (or prior to completing) the readout of all the pointers, the sum value would be calculated with the pointer values used before and after the update mixed with each other, thereby sometimes causing an error in determining the consistency.

Therefore, it has been a common practice to stop updating a database or to exclusively control access to at least a part of the database during the process of determining the consistency (see, for example, Japanese Published Patent Application H8-249222). If the data size of the database is large, however, the update processing is generally halted for a large amount of time or the update processing is significantly delayed, which sometimes leads to a reduction in user-friendliness. Accordingly, there has been suggested a technique for determining the consistency without halting the update processing (see Japanese Published Patent Application 2001-142765).

In the technique of Japanese Published Patent Application 2001-142765, the determination process is performed several times without performing exclusive control with respect to other processes. Then, it is determined, based on the result of the determination performed several times, whether it is highly probable that there is consistency. Therefore, this technique cannot determine the consistency reliably and the result of determination of the consistency varies depending on other processes being performed during the process of consistency determination.

BRIEF SUMMARY OF THE INVENTION

Therefore, it is an object of the present invention to provide a database management system, a database management method, and a program capable of solving the above problems.

According to the present invention, there is provided a database management system operable to determine consistency in a hierarchical database. The hierarchical database includes a plurality of segment data with each segment data being identified by a retention address and having one or more pointers to other segment data.

The database management system includes a data reading section for sequentially reading the pointers of the segment data from the hierarchical database, an address hash value generating section for generating an address hash value which is a hash value of the retention addresses of the segment data read by the data reading section, a pointer hash value generating section for generating a pointer hash value which is a hash value of the pointers included in the segment data read by the data reading section, an address hash value correcting section for correcting the address hash value, when the hierarchical database is updated, based on a retention address of segment data added or deleted by the update, a pointer hash value correcting section for correcting the pointer hash value, when the hierarchical database is updated, based on each pointer changed by the update, and a consistency determining section for determining that the hierarchical database is consistent if the address hash value corrected by the address hash value correcting section coincides with the pointer hash value corrected by the pointer hash value correcting section. In addition, a database management method and a computer program product are provided.

According to the present invention, it is possible to determine the consistency of a database appropriately without halting the database update.

BRIEF DESCRIPTION OF SEVERAL VIEWS OF THE DRAWINGS

Like reference symbols in the various drawings indicate like elements.

DETAILED DESCRIPTION OF THE INVENTION

Implementations of the present invention relates generally to databases, and a database management system, a database management method, and program for determining consistency in a database. The following description is presented to enable one of ordinary skill in the art to make and use the invention and is provided in the context of a patent application and its requirements. Various modifications to implementations and the generic principles and features described herein will be readily apparent to those skilled in the art. Thus, the present invention is not intended to be limited to the implementations shown but is to be accorded the widest scope consistent with the principles and features described herein.

Figure 1:
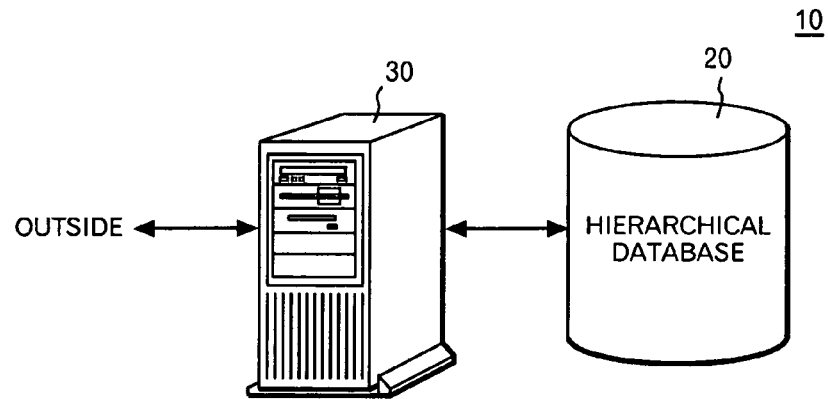
FIG. 1 shows an overall configuration of a database system.

Referring to FIG. 1, there is shown an overall configuration of a database system 10. The database system 10 is provided with a hierarchical database 20 and a database management system 30. The hierarchical database 20 includes a plurality of segment data each of which has one or more pointers to other segment data. The database management system 30 determines consistency of pointers and retention addresses of segment data pointed to by the pointers in the hierarchical database 20. The database management system 30 in this embodiment aims at appropriately determining the consistency even if the database is updated in the middle of the process of determining the consistency.

Figure 2:
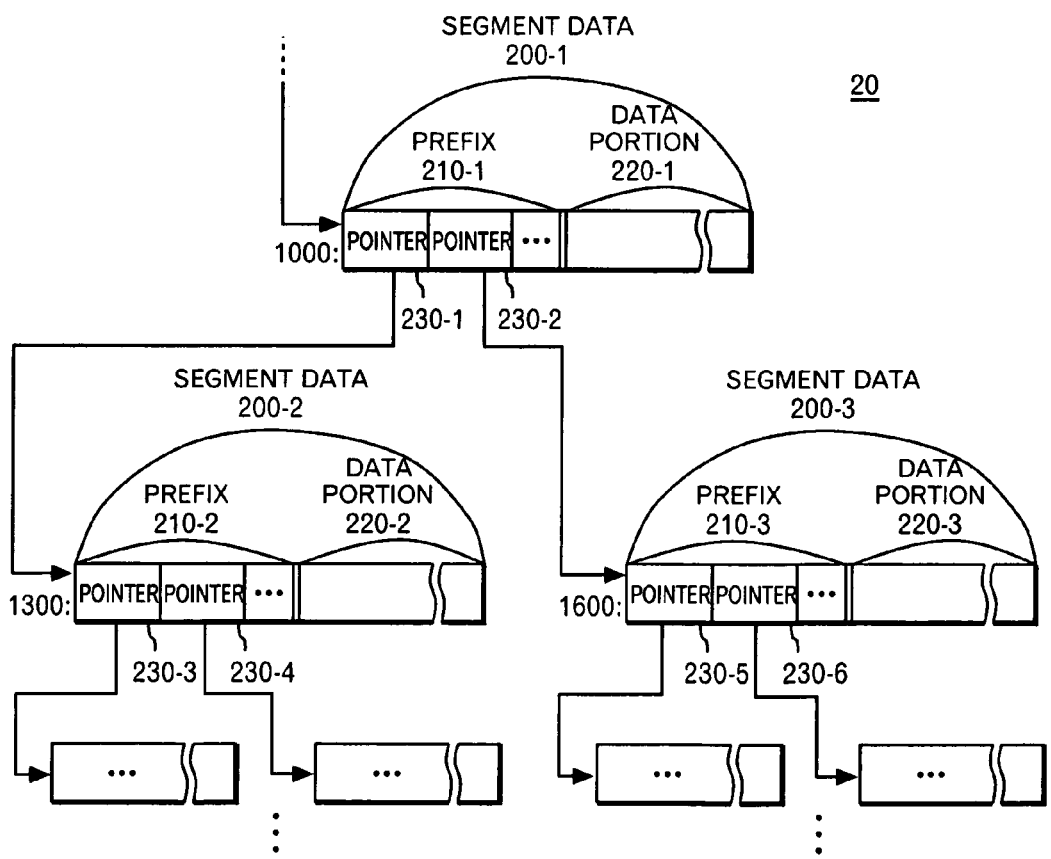
FIG. 2 shows an example of data structure of a hierarchical database.

Referring to FIG. 2, there is shown an example of data structure of the hierarchical database 20. The hierarchical database 20 includes segment data 200-1, 200-2, and 200-3. The segment data 200-1 includes a prefix 210-1 and a data portion 220-1. The retention address of the segment data 200-1 is 1000. In this regard, the retention address means, for example, a beginning address (relative byte address (RBA)) of the segment data 200-1 relative to a predetermined reference address of the hierarchical database 20. The prefix 210-1 includes a pointer 230-1 for pointing to a retention address 1300 of the segment data 200-2 and a pointer 230-2 for pointing to a retention address 1600 of the segment data 200-3.

Similarly, the segment data 200-2 includes a prefix 210-2 and a data portion 220-2. The prefix 210-2 includes a pointer 230-3 for pointing to a retention address of another segment data and a pointer 230-4 for pointing to a retention address of still another segment data. The segment data 200-3 includes a prefix 210-3 and a data portion 220-3. The prefix 210-3 includes a pointer 230-5 for pointing to a retention address of another segment data and a pointer 230-6 for pointing to a retention address of still another segment data.

Thus, the hierarchical database 20 has a hierarchical structure that enables segment data to be sequentially accessed by tracing the pointers recorded in the prefixes of the respective segment data. Therefore, the pointer value has to coincide with the retention address of the segment data pointed to by the pointer concerned. The database management system 30 in this embodiment determines the consistency in the hierarchical database 20 by determining whether there is a match between the pointer and the retention address.

Figures 3, 4:
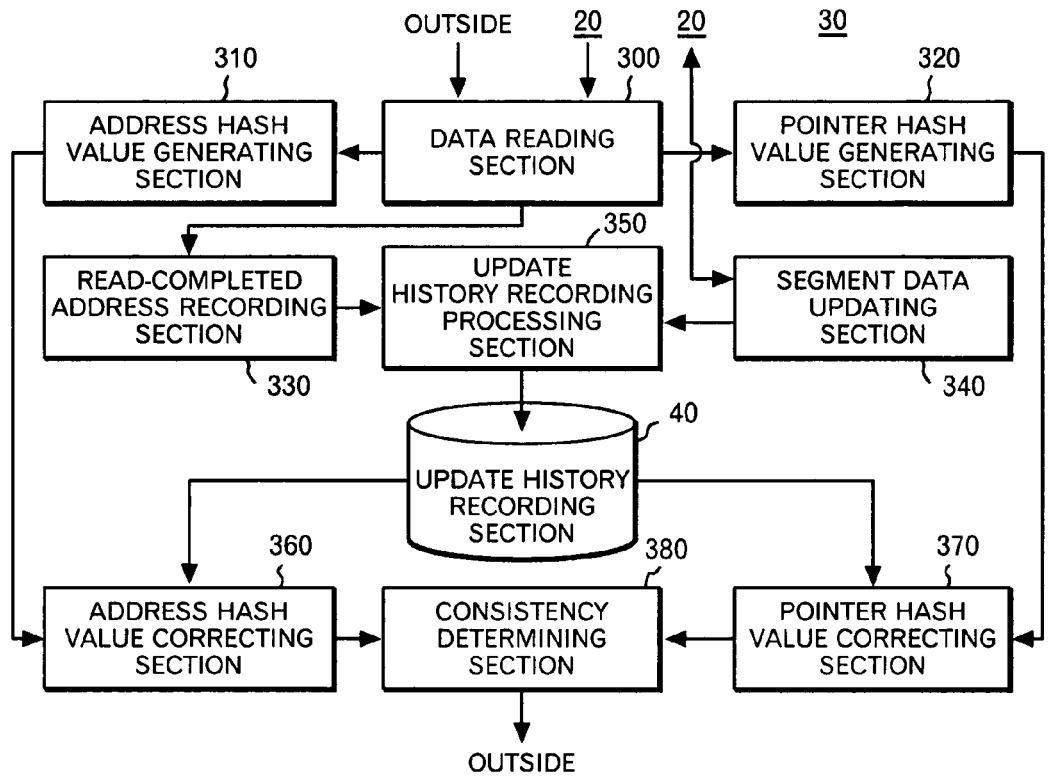
FIG. 3 shows a functional block diagram of a database management system according to the present invention.
FIG. 4 shows an example of data structure of an update history recording section in the database management system.

Referring to FIG. 3, there is shown a functional block diagram of the database management system 30. The database management system 30 includes a data reading section 300, an address hash value generating section 310, a pointer hash value generating section 320, a read-completed address recording section 330, a segment data updating section 340, an update history record processing section 350, an address hash value correcting section 360, a pointer hash value correcting section 370, a consistency determining section 380, and an update history recording section 40. The data reading section 300 starts to read segment data regularly or upon receiving an instruction of starting the determination of consistency from the outside. Then, the data reading section 300 sequentially reads the pointers of the segment data from the hierarchical database 20.

The address hash value generating section 310 generates an address hash value which is a hash value of the retention addresses of segment data read by the data reading section 300. For example, the address hash value generating section 310 may generate the address hash value by summing the retention addresses of the segment data. The pointer hash value generating section 320 generates a pointer hash value which is a hash value of the pointers included in the segment data read by the data reading section 300. For example, the pointer hash value generating section 320 may calculate the pointer hash value by summing the values of the pointers included in the segment data.

The read-completed address recording section 330 records read-completed addresses already read by the data reading section 300. For example, as the data reading section 300 reads the segment data, the read-completed address recording section 330 sequentially updates address values in predetermined ascending or descending order from the first address where the read operation should be started.

The segment data updating section 340 updates the hierarchical database 20 based on, for example, an instruction from a user. For example, when new segment data is added between first and second segment data, the segment data updating section 340 changes a pointer to the second segment data included in the first segment data to a retention address of the new or third segment data and places the pointer to the second segment data in the third segment data.

Whenever the contents of an address already read by the data reading section 300 is updated, the update history recording section 40 records a retention address of segment data added by the update, a retention address of segment data deleted by the update, a pointer value before change or deletion of that pointer, and a pointer value after change or addition of that pointer. An example of the data structure of the update history recording section 40 will next be described.

Referring to FIG. 4, there is shown an example of the data structure of the update history recording section 40. The update history recording section 40 has a retention address recording area 400 for use in recording a retention address of segment data to be updated, a pre-change pointer recording area 410 for use in recording, when the segment data is updated, a value of a pointer in that segment data before it is changed by the update, and a post-change pointer recording area 420 for use in recording a changed value of the pointer in that segment data. While the update history recording section 40 is provided inside the housing of the database management system 30 in this embodiment, it is not limited to this structure and may be implemented in a memory that can be accessed by the database management system 30.

Returning to FIG. 3, when the segment data updating section 340 updates the contents of an address recorded in the read-completed address recording section 330 or an address precedent to or lower than that address, the update history record processing section 350 determines that the contents of an address already read by the data reading section 300 has been updated. Then, when a value of a pointer in existing segment data is changed, the update history record processing section 350 records a retention address of that segment data in the retention address recording area 400, records a pre-change value of the pointer in that segment data in the pre-change pointer recording area 410, and records a post-change value of the pointer in that segment data in the post-change pointer recording area 420.

It is assumed here that new segment data (address 1200) is added between first segment data (address 1000) and second segment data (address 1100). The segment data updating section 340 changes the pointer to the second segment data included in the first segment data to a retention address of the new or third segment data. In this case, the update history record processing section 350 records the retention address (i.e., 1000) of the first segment data in the retention address recording area 400. Furthermore, the update history record processing section 350 records the retention address (i.e., 1100) of the second segment data in the pre-change pointer recording area 410 corresponding to that retention address recording area 400. Still further, the update history record processing section 350 records the retention address (i.e., 1200) of the third segment data in the post-change pointer recording area 420 corresponding to that retention address recording area 400.

Then, the update history record processing section 350 records the retention address (i.e., 1200) of the third segment data in a different entry of the retention address recording area 400. Furthermore, the update history record processing section 350 records pointerless information (for example, null data) indicating that no pointer is included, in the pre-change pointer recording area 410 corresponding to that different entry. Still further, the update history record processing section 350 records the retention address (i.e., 1100) of the second segment data in the post-change pointer recording area 420 corresponding to that different entry.

Next, it is assumed that third segment data (address 2100) between first segment data (address 2000) and second segment data (address 2200) is deleted. The segment data updating section 340 changes the pointer to the third segment data included in the first segment data to the retention address of the second segment data. In this case, the update history record processing section 350 records the retention address (i.e., 2000) of the first segment data in the retention address recording area 400. Furthermore, the update history record processing section 350 records the retention address (2100) of the third segment data in the pre-change pointer recording area 410 corresponding to that retention address recording area 400. Still further, the update history record processing section 350 records the retention address (2200) of the second segment data in the post-change pointer recording area 420 corresponding to that retention address recording area 400.

Then, the update history record processing section 350 records the retention address (i.e., 2100) of the third segment data in a different entry of the retention address recording area 400. Furthermore, the update history record processing section 350 records pointerless information in the post-change pointer recording area 420 corresponding to that different entry. Still further, the update history record processing section 350 records the retention address (i.e., 2200) of the second segment data in the pre-change pointer recording area 410 corresponding to that different entry.

When the contents of an address already read by the data reading section 300 is updated, the address hash value correcting section 360 corrects the address hash value based on a retention address of segment data added or deleted by the update, and the pointer hash value correcting section 370 corrects the pointer hash value based on each pointer whose value has been changed by the update.

If the address hash value corrected by the address hash value correcting section 360 coincides with the address hash value corrected by the pointer hash value correcting section 370, the consistency determining section 380 determines that the hierarchical database 20 is consistent and outputs the result of the determination.

Figure 5:
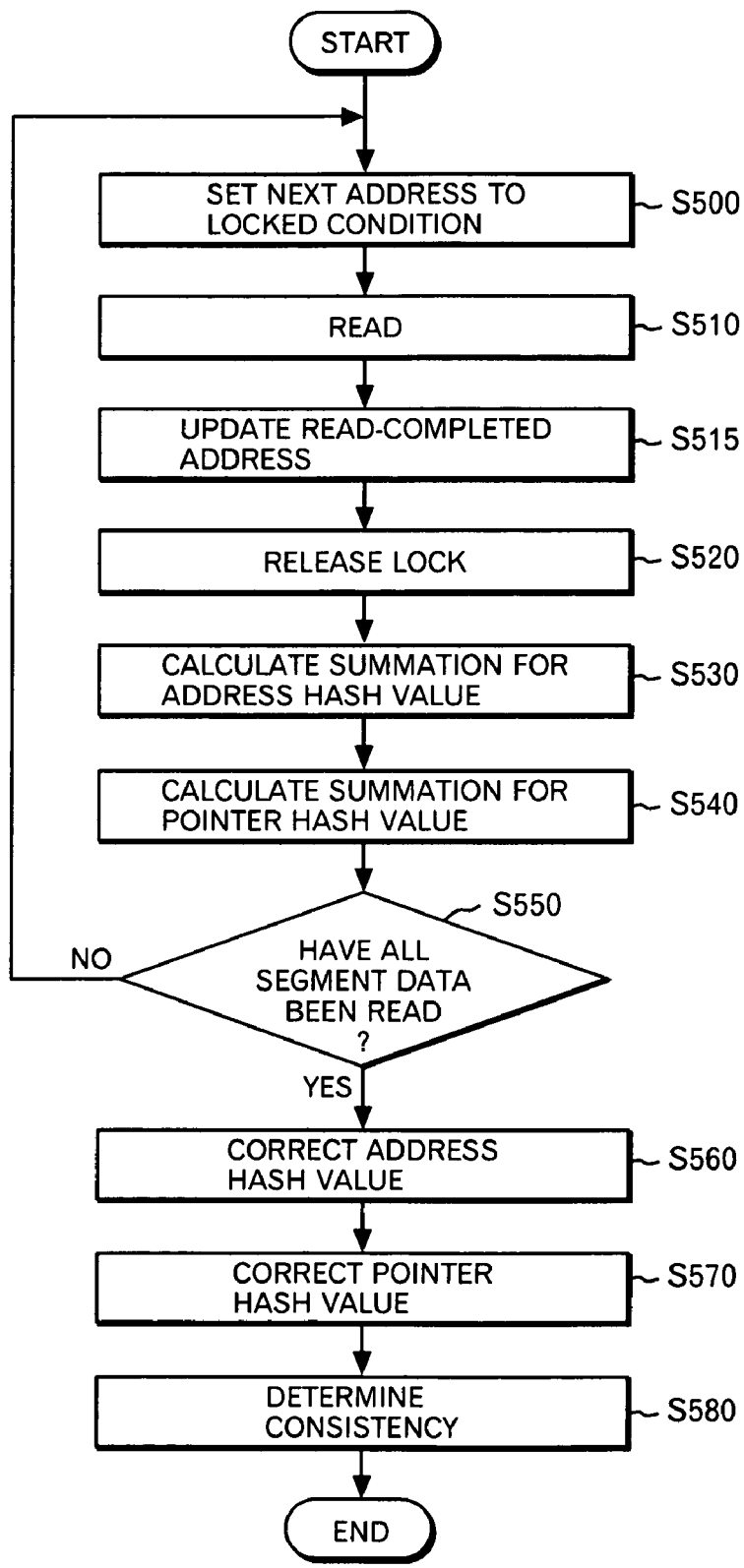
FIG. 5 shows a processing flow for determining consistency by generating an address hash value and a pointer hash value.

Referring to FIG. 5, there is shown a processing flow for determining the consistency by generating an address hash value and a pointer hash value. The data reading section 300 sets segment data having an address to be read next to an address recorded by the read-completed address recording section 330 to a locked condition under which the data can be exclusively read or written (S500). Subsequently, the data reading section 300 reads a pointer or pointers of the segment data in the locked condition (S510). Further, the data reading section 300 records that address to be read in the read-completed address recording section 330 in the locked condition (S515). Then, the data reading section 300 releases the lock (S520).

Subsequently, the address hash value generating section 310 calculates an address hash value at the time of reading by adding the retention address of the read segment data to the address hash value already calculated (S530). The pointer hash value generating section 320 calculates a pointer hash value at the time of reading by adding the value of the pointer to the read segment data to the pointer hash value already calculated (S540). The above processing is repeated until all segment data have been read (S550).

Here, the hash value is not limited to a sum value and may be any other value which is calculated from addresses or pointers for which the consistency should be determined and has a different value for a different address or pointer with extremely high probability. Preferably, the hash value calculated based on the plurality of addresses is identical irrespective of the order of summation in which the plurality of addresses have been summed to obtain the hash value. As an example, the hash value may be a simple sum value as described above, a sum value summed under a predetermined modulo, or an exclusive OR.

If all the segment data have been read (S550: YES), the following processing is performed. First, if the contents of any address already read by the data reading section 300 are updated during the time period after the data reading section 300 reads one of the segment data until it reads all of the segment data, the address hash value correcting section 360 corrects the address hash value generated by the address hash value generating section 310 (S560).

In particular, the address hash value correcting section 360 reads the retention addresses of all segment data added by the update from the update history recording section 40, calculates a sum value, and adds it to the address hash value. Then, the address hash value correcting section 360 reads the retention addresses of all segment data deleted by the update from the update history recording section 40, calculates a sum value, and subtracts it from the address hash value obtained by adding the former sum value.

If the contents of any address already read by the data reading section 300 are updated during the time period after the data reading section 300 reads one of the segment data until it reads all of the segment data, the pointer hash value correcting section 370 corrects the pointer hash value generated by the pointer hash value generating section 320 (S570). In particular, the pointer hash value correcting section 370 reads all of the pointer values changed or added by the update from the update history recording section 40, calculates a sum value, and adds it to the pointer hash value. Then, the pointer hash value correcting section 370 reads all of the pointer values used before the change or deletion caused by the update from the update history recording section 40, calculates a sum value, and subtracts it from the pointer hash value to which the former sum value has been added.

Then, the consistency determining section 380 determines that the hierarchical database 20 is consistent and outputs the result of the determination if the address hash value corrected by the address hash value correcting section 360 coincides with the pointer hash value corrected by the pointer hash value correcting section 370 (S580).

Figure 6:
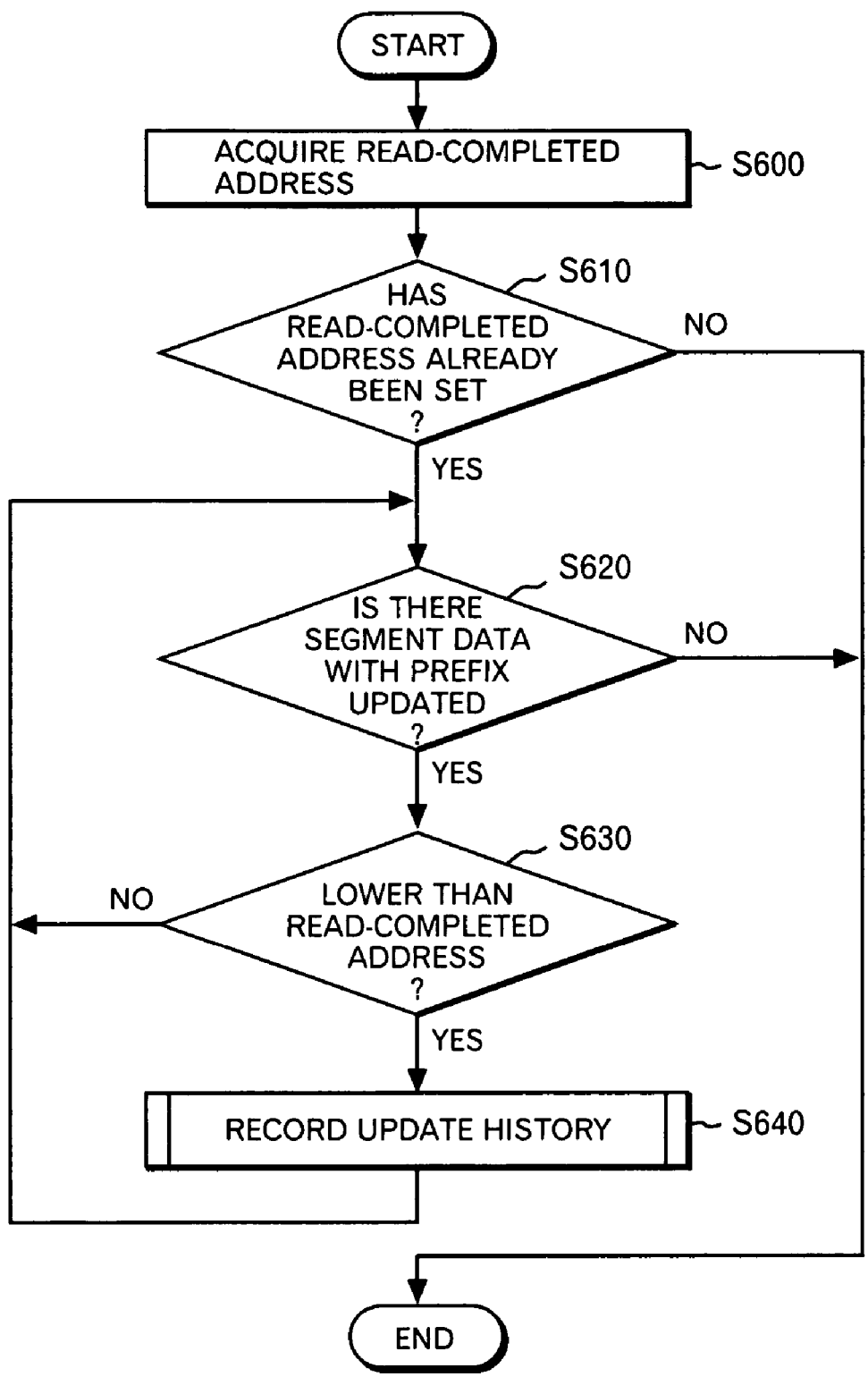
FIG. 6 shows a processing flow for recording an update history.

Referring to FIG. 6, there is shown a processing flow for recording an update history. The database management system 30 performs the following processing on condition that it has completed a series of update operations for the hierarchical database 20 and is ready for the next update operation (for example, at a synchronization point), whenever the hierarchical database 20 is updated. First, the update history record processing section 350 acquires a read-completed address from the read-completed address recording section 330 (S600). Then, the update history record processing section 350 determines whether a valid value is set to the read-completed address, in other words, whether the consistency determination is being performed (S610).

If the valid value is not set to the read-completed address (S610: NO), the update history record processing section 350 terminates the process. On the other hand, if the valid value is set, the update history record processing section 350 determines whether there is segment data whose prefix has been changed by the update (S620). If there is no segment data whose prefix has been changed (S620: NO), the update history record processing section 350 terminates the process.

On the other hand, if there is segment data whose prefix has been changed (S620: YES), the database management system 30 determines whether the updated segment data is recorded at the same address as the read-completed address or at an address precedent to or lower than the read-completed address (S630). If the updated segment data is recorded at an address higher than the read-completed address (S630: NO), the update history record processing section 350 returns the processing to S620. On the other hand, if the updated segment data is recorded at the same address as the read-completed address or at an address lower than the read-completed address (S630: YES), the update history record processing section 350 records the update history in the update history recording section 40 (S640) and returns the processing to S620.

Figure 7:
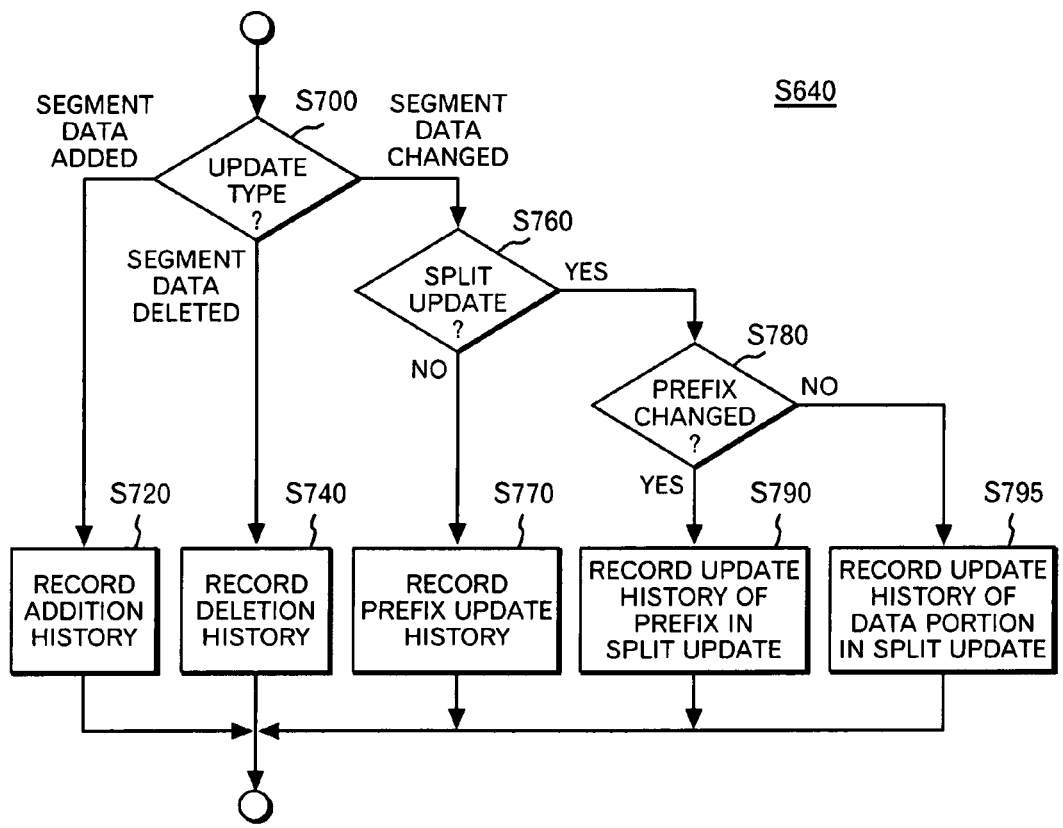
FIG. 7 shows details of the processing step S640 in FIG. 6.

Referring to FIG. 7, there are shown details of the process in S640 shown in FIG. 6. The update history record processing section 350 determines an update type indicating a type of updating the hierarchical database 20 S700). If the update type is addition of segment data (S710: SEGMENT DATA ADDED), the update history record processing section 350 records a history of adding the segment data in the update history recording section 40 (S720). In other words, the update history record processing section 350 records the retention address of the segment data in the retention address recording area 400, records pointerless information in the pre-change pointer recording area 410, and records the value of the pointer generated anew in the segment data in the post-change pointer recording area 420.

Secondly, if the update type is deletion of segment data (S700: SEGMENT DATA DELETED), the update history record processing section 350 records the history of deleting the segment data in the update history recording section 40 (S740). In other words, the update history record processing section 350 records the retention address of the segment data in the retention address recording area 400, records the value of the pointer included in the segment data in the pre-change pointer recording area 410, and records the pointerless information in the post-change pointer recording area 420.

Lastly, if the update type is change of the content of existing segment data (S700: SEGMENT DATA CHANGED), the update history record processing section 350 determines whether the update type is a split update for splitting off a part of certain segment data into another segment data (S760). If the update type is not the split update (S760: NO), the update history record processing section 350 records a prefix update history in the update history recording section 40. In other words, for example, the update history record processing section 350 records the retention address of the segment data to be updated in the retention address recording area 400, records the pre-change value of the pointer in the segment data in the pre-change pointer recording area 410, and records the post-change value of the pointer in the post-change pointer recording area 420.

On the other hand, if the update type is the split update (S760: YES), the update history record processing section 350 determines whether the prefix is changed in the split update (S780). If the prefix is changed, the update history record processing section 350 records the update history of the prefix in the split update in the update history recording section 40 (S790). On the other hand, if the prefix is not changed (S780: NO), the update history record processing section 350 records the update history of the data portion in the split update in the update history recording section 40 (S795). The details of the method for recording the update history in the split update will be described later with reference to FIG. 10.

As described above, according to the configuration shown in FIG. 1 to FIG. 7, even if the contents of the read-completed address have been updated during reading of pointers, the sum value of the read pointers can be appropriately corrected by appropriately recording the difference caused by the update. In addition, since the read-completed addresses during the pointer checking are automatically updated and managed by the database management system 30, no specific command input from the user is required. Moreover, since the update history recording section 40 records an update history only during reading of pointers, a small storage capacity is generally enough for the update history recording section 40, by which there is hardly a need for a new expenditure on capital equipment. In this manner, according to the database management system 30 in this embodiment, an online pointer checking can be achieved during the update of the hierarchical database 20, thereby significantly increasing availability of the hierarchical database 20, without increasing the user's time and cost.

The following describes examples of processing for adding, deleting, and splitting segment data in the hierarchical database 20 and the database management system 30 described above.

Figure 8:
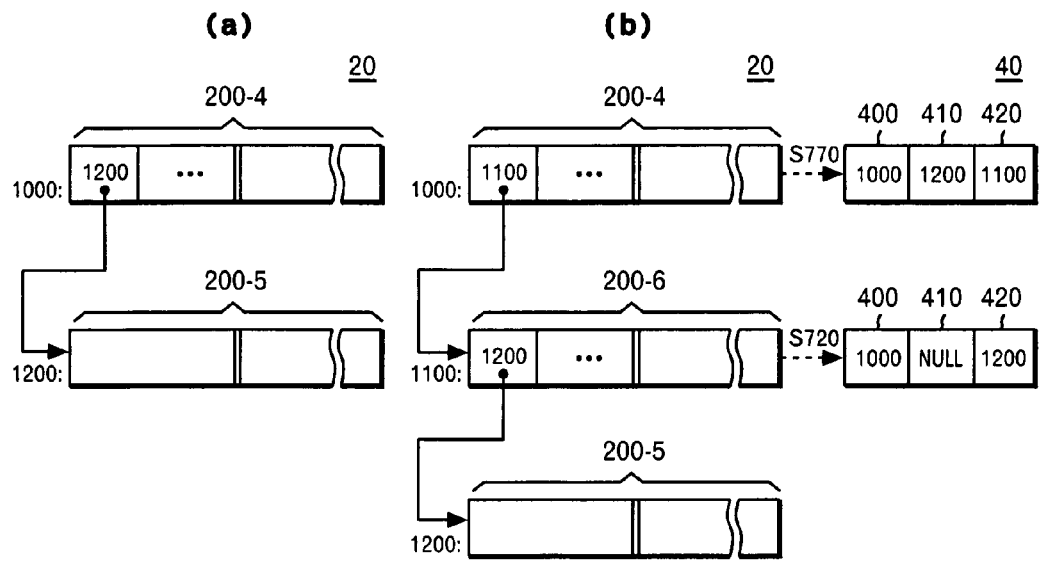
FIGS. 8A and 8B show an example of processing for adding segment data.

Referring to FIG. 8, there is shown an example of adding segment data. FIG. 8(a) shows the hierarchical database 20 before adding the segment data. The hierarchical database 20 has segment data 200-4 with a retention address of 1000 and segment data 200-5 with a retention address of 1200. The segment data 200-4 includes a pointer to the segment data 200-5 in its prefix.

FIG. 8(b) shows the hierarchical database 20 and the update history recording section 40 after adding segment data. When adding the segment data 200-6 between the segment data 200-4 and the segment data 200-5, the segment data updating section 340 changes the pointer to the segment data 200-5 included in the segment data 200-4 to the retention address of the segment data 200-6. Then, the segment data updating section 340 generates the pointer to the segment data 200-5 in the segment data 200-6.

As a result, the hierarchical database 20 includes the segment data 200-6 added anew at the retention address 1100. Then, the segment data 200-4 includes the pointer (i.e., 1100) to the segment data 200-6, instead of the pointer (i.e., 1200) to the segment data 200-5. The segment data 200-6 includes the pointer (i.e., 1200) to the segment data 200-5.

Additionally, due to the change of the pointer in the segment data 200-4 from 1200 to 1100, the update history record processing section 350 records the retention address 1000 of the segment data 200-4 in the retention address recording area 400, records the retention address 1200 of the segment data 200-5 in the pre-change pointer recording area 410 corresponding to the retention address recording area 400, and records the retention address 1100 of the segment data 200-6 in the post-change pointer recording area 420 corresponding to the retention address recording area 400 (corresponding to the process in S770).

Furthermore, since the segment data 200-6 has been added anew, the update history record processing section 350 records the retention address 1100 of the segment data 200-6 in a different entry of the retention address recording area 400, records pointerless information (e.g., null) in the pre-change pointer recording area 410 corresponding to the different entry, and records the retention address 1200 of the segment data 200-5 in the post-change pointer recording area 420 corresponding to the different entry (corresponding to the process in S720).

Figure 9:
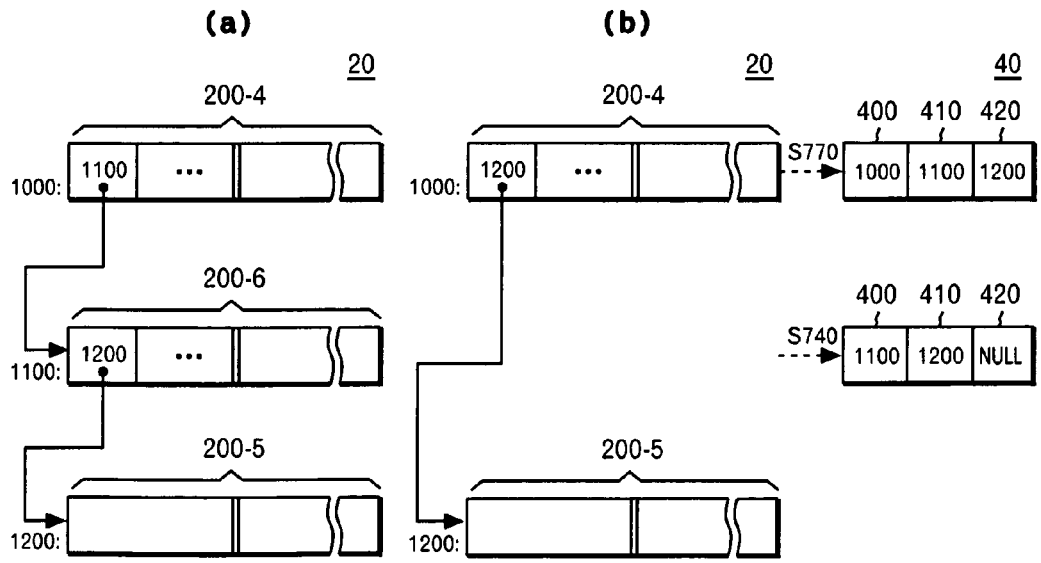
FIGS. 9A and 9B show an example of processing for deleting segment data.

Referring to FIG. 9, there is shown an example of deleting segment data. FIG. 9(a) shows the hierarchical database 20 before deleting the segment data. The hierarchical database 20 has segment data 200-4 with a retention address of 1000, segment data 200-5 with a retention address of 1200, and segment data 200-6 with a retention address of 1100. The segment data 200-4 includes the pointer to the segment data 200-6 in its prefix and the segment data 200-6 includes the pointer to the segment data 200-5 in its prefix.

FIG. 9(b) shows the hierarchical database 20 and the update history recording section 40 after deleting segment data. When deleting the segment data 200-6 between the segment data 200-4 and the segment data 200-5, the segment data updating section 340 changes the pointer to the segment data 200-6 included in the segment data 200-4 to the retention address of the segment data 200-5.

As a result, the hierarchical database 20 does not include the deleted segment data 200-6. The segment data 200-4 includes the pointer (i.e., 1200) to the segment data 200-5, instead of the pointer (i.e., 1100) to the segment data 200-6.

Additionally, due to the change of the pointer in the segment data 200-4 from 1100 to 1200, the update history record processing section 350 records the retention address of the segment data 200-4 in the retention address recording area 400 and records the retention address of the segment data 200-6 in the pre-change pointer recording area 410. Furthermore, the update history record processing section 350 records the retention address of the segment data 200-5 in the post-change pointer recording area 420 corresponding to the retention address recording area 400 (corresponding to the process in S770).

Furthermore, due to the deletion of the segment data 200-6, the update history record processing section 350 records the retention address of the segment data 200-6 in a different entry of the retention address recording area 400 and records the retention address of the segment data 200-5 in the pre-change pointer recording area 410 corresponding to the different entry. Still further, the update history record processing section 350 records pointerless information in the post-change pointer recording area 420 corresponding to the different entry (corresponding to the process in S740).

Figure 10:
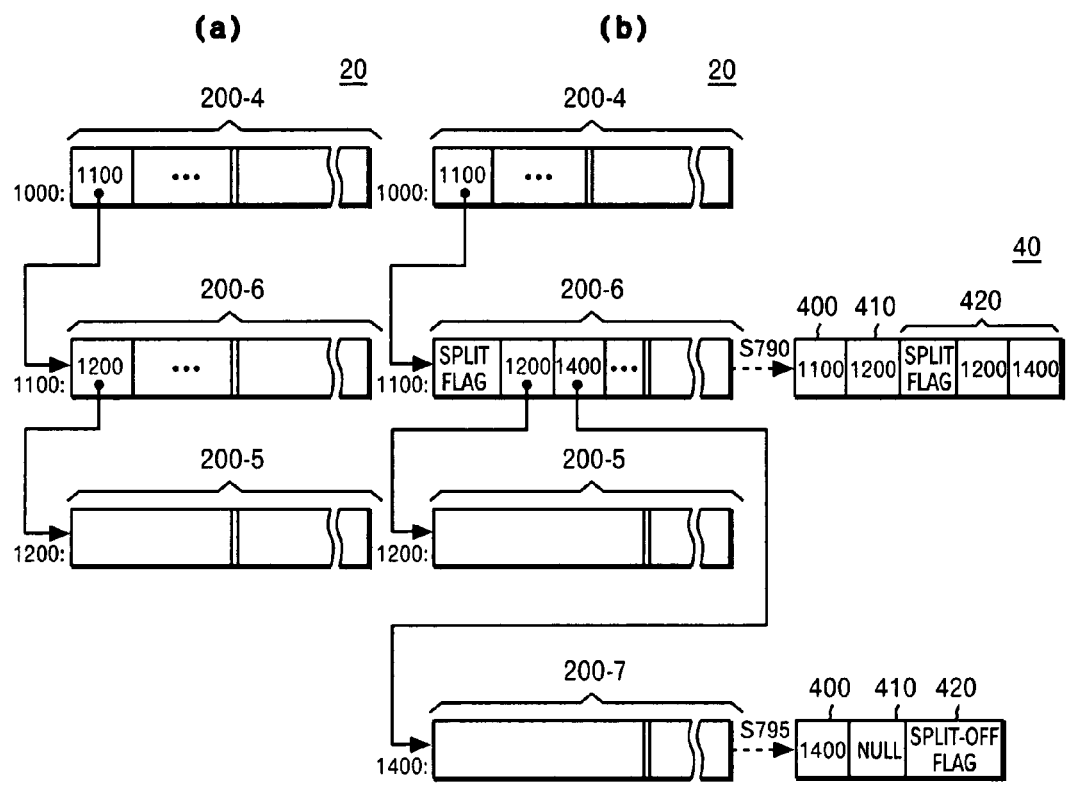
FIGS. 10A and 10B show an example of processing for splitting segment data.

Referring to FIG. 10, there is shown an example of a process for splitting segment data. FIG. 10(a) shows the hierarchical database 20 before splitting segment data. Since the situation is substantially the same as in FIG. 9(a), its description is omitted here. FIG. 10(b) shows the hierarchical database 20 and the update history recording section 40 after splitting the segment data.

When splitting off a part of the segment data 200-6 having the pointer to the segment data 200-5 into a segment data 200-7, the segment data updating section 340 adds the pointer to the segment data 200-7 in the segment data 200-6 and adds a split flag indicating that a part of the segment data 200-6 has been split off. As a result, the hierarchical database 20 includes the segment data 200-7 anew which has been split off from the segment data 200-6. The segment data 200-6 further includes the pointer (i.e., 1400) to the segment data 200-7 and the split flag.

Additionally, due to the addition of the pointer to the retention address of the segment data 200-7 and the split flag to the segment data 200-6, the update history record processing section 350 records the retention address 1100 of the segment data 200-6 in the retention address recording area 400 and records the retention address 1200 of the segment data 200-5 in the pre-change pointer recording area 410 corresponding to the retention address recording area 400. The update history record processing section 350 records the split flag and the retention address 1400 of the segment data 200-7 in the post-change pointer recording area 420 corresponding to the retention address recording area 400 (corresponding to the process in S790).

Moreover, due to the addition of the segment data 200-7, the update history record processing section 350 records the retention address 1400 of the segment data 200-7 in a different entry of the retention address recording area 400 and records pointerless information into the pre-change pointer recording area 410 corresponding to the different entry. Then, the update history record processing section 350 records a split-off flag indicating that the segment data concerned has been split off in the post-change pointer recording area 420 corresponding to the different entry (corresponding to the process in S795).

The following describes three specific examples of the consistency determination process in which different read-completed addresses are used.

Figure 11:
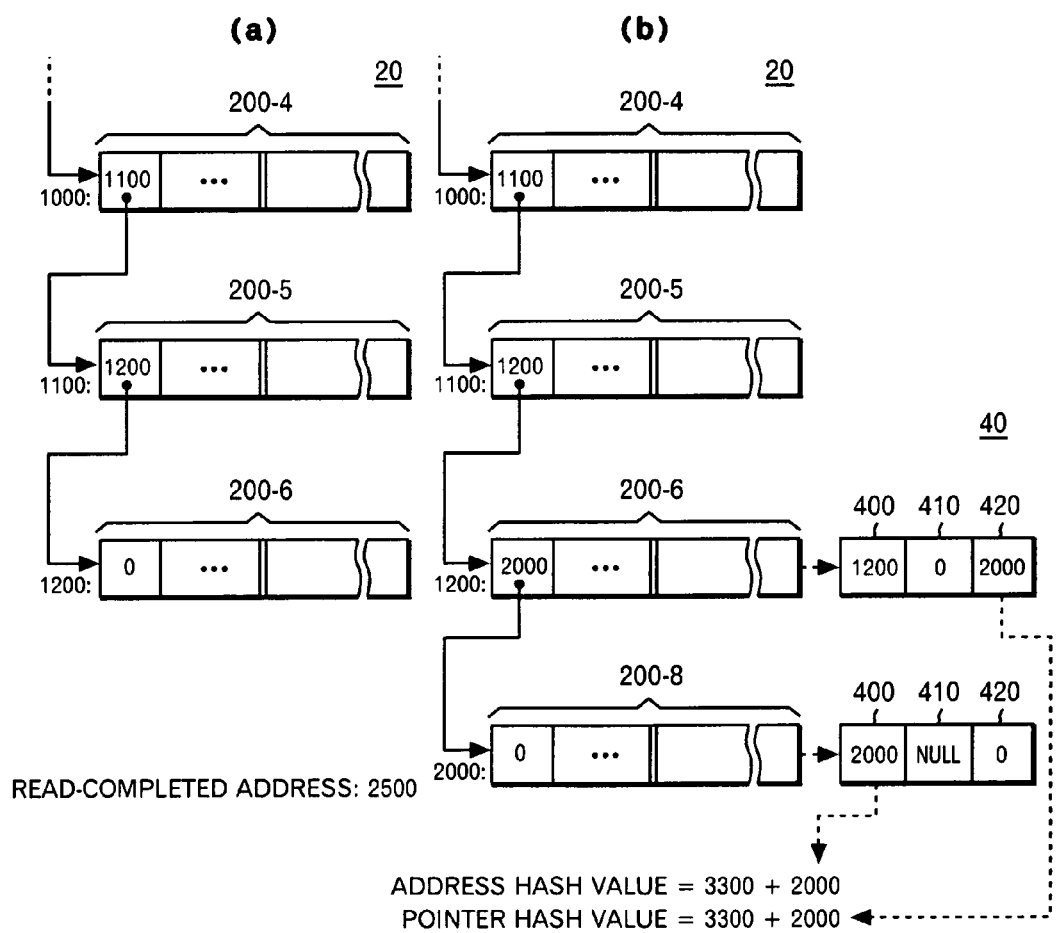
FIGS. 11A and 11B show an example of processing for adding segment data to an address having already been read.

Referring to FIG. 11, there is shown an example of adding segment data to an already read address. FIG. 11(a) shows the hierarchical database 20 before adding the segment data. In this example, it is assumed that the read-completed address recording section 330 is incremented in ascending order and it currently stores the address value 2500.

The hierarchical database 20 includes segment data 200-4, 200-5, and 200-6. The segment data 200-4 includes the pointer to the segment data 200-5. The segment data 200-5 includes the pointer to the segment data 200-6. The retention addresses of the segment data 200-4, 200-5, and 200-6 are 1000, 1100, and 1200, respectively. In other words, all the segment data have already been read by the data reading section 300.

FIG. 11(b) shows the hierarchical database 20 and the update history recording section 40 after the segment data has been added. The segment data updating section 340 adds new segment data 200-8 to the hierarchical database 20 and uses the pointer in the segment data 200-6 to point to the segment data 200-8. Due to the update of the contents of the address lower than the read-completed address 2500, the update history record processing section 350 records the histories of the segment data 200-6 and 200-8.

More specifically, the update history record processing section 350 records the retention address 1200 of the segment data 200-6 in the retention address recording area 400, records the value 0 of the pre-change pointer in the pre-change pointer recording area 410, and records the value 2000 of the post-change pointer in the post-change pointer recording area 420. In addition, the update history record processing section 350 records the retention address 2000 of the segment data 200-8 in the retention address recording area 400, records pointerless information in the pre-change pointer recording area 410, and records the value 0 of the post-change pointer in the post-change pointer recording area 420.

The address hash value generating section 310 sums the retention addresses before the update and thus achieves 3300 by 1000+1100+1200 as an address hash value. The pointer hash value generating section 320 sums the values of the pointers before the update and thus achieves 3300 by 1000+1100+1200 as a pointer hash value.

Then, the address hash value correcting section 360 adds the sum of the values in the retention address recording area 400 corresponding to the pre-change pointer recording area 410 containing the pointerless information to the address hash value. Specifically, 5300 is achieved by 3300+2000 as a corrected value of the address hash value. In addition, the pointer hash value correcting section 370 calculates the sum of the pointer values recorded in the pre-change pointer recording area 410 of the update history recording section 40 excluding the pointerless information, and subtracts the sum from the pointer hash value. In other words, the pointer hash value is unchanged. Furthermore, the pointer hash value correcting section 370 calculates the sum of the pointer values recorded in the post-change pointer recording area 420 of the update history recording section 40 excluding the pointerless information and adds the sum to the pointer hash value. In other words, the pointer hash value 5300 is obtained by 3300+2000.

As a result of the foregoing correction, the consistency determining section 380 can determine that the hierarchical database 20 is consistent since the corrected address hash value coincides with the corrected pointer hash value.

Figure 12:
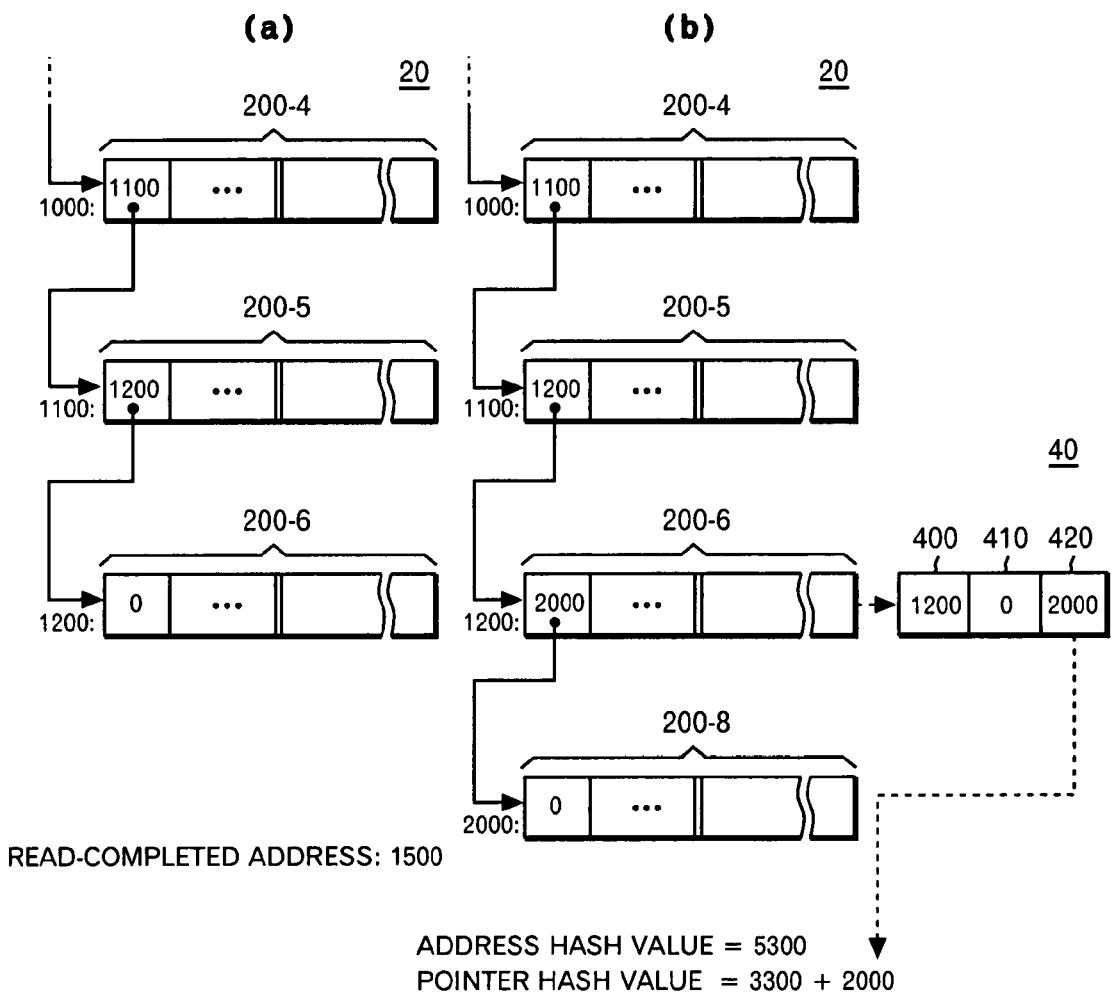
FIGS. 12A and 12B show an example of processing for updating both of the contents of an address having already been read and an address not having been read yet.

Referring to FIG. 12, there is shown an example of updating both of the contents of an already read address and an address not having been read yet. FIG. 12(*a*) shows the hierarchical database 20 before adding segment data. This is substantially the same as FIG. 11(*a*) and therefore its description is omitted here.

FIG. 12(*b*) shows the hierarchical database 20 and the update history recording section 40 after adding the segment data. The segment data updating section 340 adds new segment data 200-8 to the hierarchical database 20 and uses the pointer in the segment data 200-6 to point to the segment data 200-8. Due to the update of the contents of the address lower than the read-completed address 1500, the update history record processing section 350 records the history of the segment data 200-6.

Specifically, the update history record processing section 350 records the retention address 1200 of the segment data 200-6 in the retention address recording area 400, records the value 0 of the pre-change pointer in the pre-change pointer recording area 410, and records the value 2000 of the post-change pointer in the post-change pointer recording area 420. On the other hand, the update history record processing section 350 does not record a change history of the segment data 200-8 since the retention address thereof is higher than the read-completed address.

The address hash value generating section 310 sums the retention addresses of the segment data having been read and therefore generates 5300 as an address hash value by calculating 1000+1100+1200+2000. The pointer hash value generating section 320 sums the values of the pointers having been read and therefore generates 3300 as a pointer hash value by calculating 1000+1100+1200.

Then, the pointer hash value correcting section 370 calculates the sum of the pointer values recorded in the pre-change pointer recording area 410 of the update history recording section 40 excluding the pointerless information and subtracts the sum from the pointer hash value. In other words, the pointer hash value is unchanged. Furthermore, the pointer hash value correcting section 370 calculates the sum of the pointer values recorded in the post-change pointer recording area 420 of the update history recording section 40 excluding the pointerless information and adds the sum to the pointer hash value. In other words, the pointer hash value is 5300 by calculating 3300+2000.

As a result of the correction, the consistency determining section 380 can determine that the hierarchical database 20 is consistent since the address hash value coincides with the corrected pointer hash value when they are compared with each other.

Figure 13:
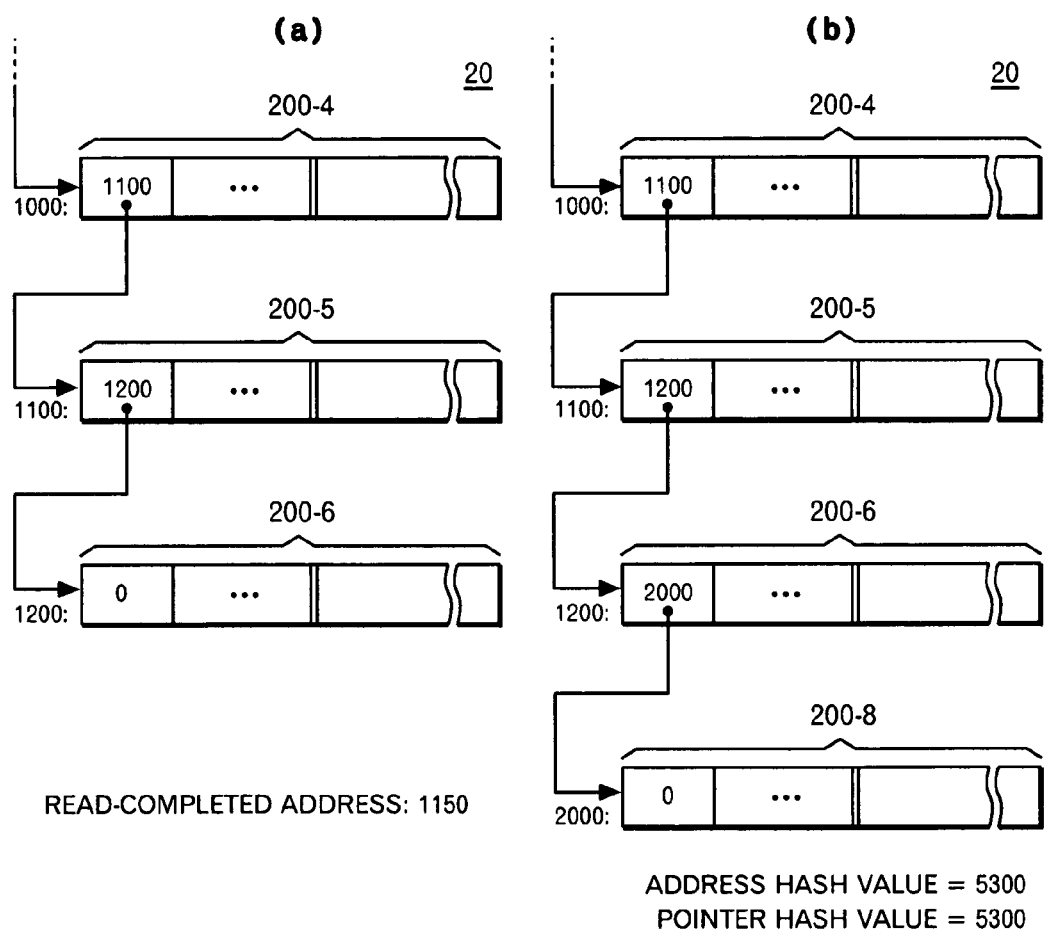
FIGS. 13A and 13B show an example of processing for adding segment data to an address not having been read yet.

Referring to FIG. 13, there is shown an example of adding segment data to an address not having been read yet. FIG. 13(*a*) shows the hierarchical database 20 before adding the segment data. Since this is substantially the same as FIG. 11(*a*), its description is omitted here. Note here that, however, the read-completed address is 1150 and therefore the segment data 200-6 has not been read yet.

FIG. 13(*b*) shows the hierarchical database 20 after adding the segment data. The segment data updating section 340 adds new segment data 200-8 to the hierarchical database 20 and uses the pointer in the segment data 200-6 to point to the segment data 200-8. Due to the change in only the contents of the addresses higher than the read-completed address 1150, the update history record processing section 350 does not record any update history.

Then, the address hash value generating section 310 sums the retention addresses of the segment data having been read and therefore achieves 5300 as an address hash value by calculating 1000+1100+1200+2000. The pointer hash value generating section 320 sums the values of the pointers having been read and therefore achieves 5300 as a pointer hash value by calculating 1000+1100+1200+2000.

In the example shown in FIG. 13, there is no update of the contents of an address having already been read and therefore the address hash value and the pointer hash value are not corrected. Then, the consistency determining section 380 can determine that the hierarchical database 20 is consistent since the address hash value coincides with the pointer hash value when they are compared with each other.

As apparent from these three examples described above, according to the database management system 30 in the embodiment, it is possible to determine consistency appropriately in the hierarchical database 20 not only when the segment data at a read-completed address has not been updated yet, but also when the segment data at the read-completed address has already been updated. For example, even if segment data added anew has not been read yet and only a pointer to the segment data has already been read, the consistency can be appropriately determined. By enabling the online pointer checking, availability of the hierarchical database 20 can be significantly increased.

Figure 14:
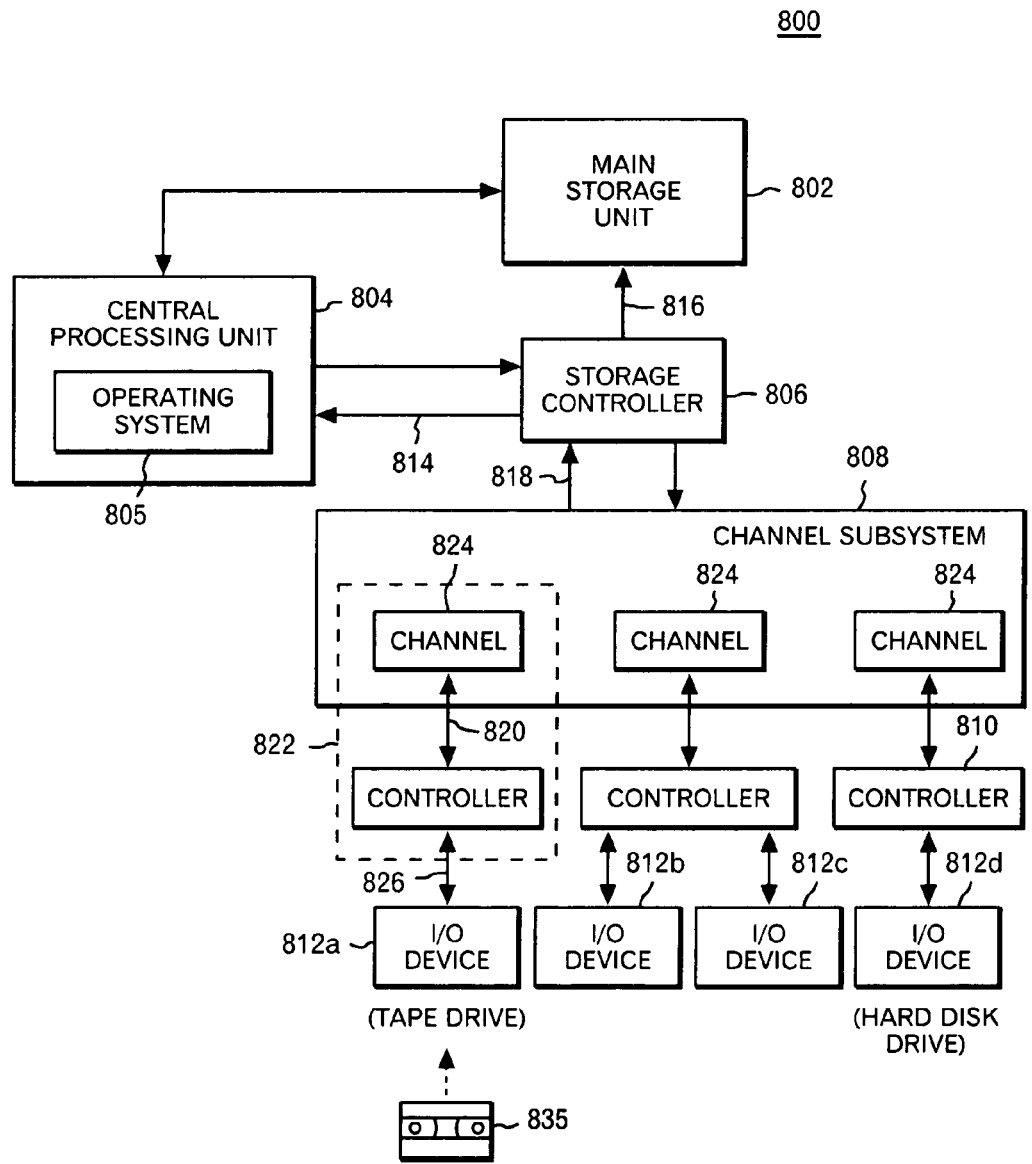
FIG. 14 shows an example of hardware configuration of a computer functioning as the database management system.

Referring to FIG. 14, there is shown an example of hardware configuration of a computer 800 functioning as the database management system 30. With reference to this diagram, the hardware configuration of the computer 800 will be described in which the computer 800 is a mainframe computer. The computer 800 comprises a main storage unit 802, at least one central processing unit 804, a storage controller 806, a channel subsystem 808, at least one controller 810, and one or more input/output devices 812a to 812d.

The main storage unit 802 stores data and programs entered from the input-output devices 812a to 812d. When the main storage unit 802 is addressed by the central processing unit 804 or the channel subsystem 808, it transmits data stored at that address to the central processing unit 804 or the channel subsystem 808. The main storage unit 802 can read and write stored data at high speed to thereby enable fast operations of the central processing unit 804.

The central processing unit 804 plays the main role of controlling the entire computer 800 and executes, for example, at least one operating system 805. The operating system 805 controls program execution and input/output processing in the computer 800. For example, the operating system 805 may control the execution of another program running on the central processing unit 804 or may control data transfer to or from each of the input/output devices 812a to 812d.

The storage controller 806 is connected to the central processing unit 804 via a bus 814 capable of performing two-way or one-way communication. The storage controller 806 is also connected to the main storage unit 802 via a bus 816 and connected to the channel subsystem 808 via a bus 818. The storage controller 806 may temporarily retain or queue an access request received from the central processing unit 804 or the channel subsystem 808 and transmit the access request to the main storage unit 802 at predetermined timing.

The channel subsystem 808 is connected to each controller 810 via a data transfer path 820. The channel subsystem 808 controls data transfer between the input/output devices 812a to 812d and the main storage unit 802. Since this reduces processing load on the central processing unit 804 for communicating with the input/output devices 812a to 812d, it is possible to execute arithmetic operations by the central processing unit 804 in parallel with input/output operations by the input/output devices 812a to 812d, so that the computer 800 can be efficiently operated.

The channel subsystem 808 transfers data to or from the input/output devices 812a to 812d via at least one channel path 822. Each channel path 822 has a channel 824 provided in the channel subsystem 808. Also, each channel path 822 has at least one controller 810 and data transfer path 820. Note here that the data transfer path 820 may be a serial link based on ESCON (Enterprise Systems Connection Architecture), for example. Alternatively, the data transfer path 820 may be a parallel OEMI or a fibre channel.

The controller 810 controls at least one of the input/output devices 812a to 812d. For example, the controller 810 may control data transfer timing for the input/output devices 812a to 812d. The controller 810 is connected with at least one of the input/output devices 812a to 812d via a bus 826. The controller 810 can be connected with up to 256 input/output devices.

Each of the input/output devices 812a to 812d transfers data to or from the main storage unit 802 via the controller 810, the channel subsystem 808, and the storage controller 806. In this configuration, the input/output device 812a is a magnetic tape drive and the input/output device 812d is a hard disk drive. Alternatively or additionally, the input/output devices 812a to 812d may be a display, a keyboard, a printer, a communication device, a sensor, or any other storage device. As an example, at least one of the input/output devices 812a to 812d may be connected to and access the hierarchical database 20.

A program provided to the computer 800 is stored in a tape recording medium 835 or other recording medium and is provided by a user. The program is read by the input/output device 812a and is stored into the main storage unit 802 via the channel subsystem 808. Then, the program stored into the main storage unit 802 is installed into the input/output device 812d (hard disk drive) via the channel subsystem 808. Since the operations that the program causes the computer 800 to perform are the same as those in the database management system 30 described with reference to FIG. 1 to FIG. 13, their description is omitted here.

The program described above may be stored in an external storage medium. The storage medium may be a flexible disk, a CD-ROM, an optical recording medium such as a DVD or a PD, a magneto-optical medium such as an MD, or a semiconductor memory such as an IC card. Alternatively, a storage device such as a hard disk drive or a RAM provided in a server system connected to a private communication network or the Internet may be used as a recording medium from which the program may be provided to the computer 800 via the network.

While the present invention has been described with reference to the preferred embodiments, the technical scope of the present invention is not limited thereto. It is to be understood by those skilled in the art that various modifications or improvements can be added to the above preferred embodiments. It is apparent from the appended claims that such modified or improved implementations fall within the technical scope of the present invention.

What is claimed is:

1. A method for determining consistency in a hierarchical database, the hierarchical database including a plurality of segment data with each segment data being identified by a retention address and having one or more pointers to other segment data, the method comprising:

sequentially reading the one or more pointers of each segment data from the hierarchical database;

generating an address hash value of retention addresses of the segment data already read;

generating a pointer hash value of the pointers included in the segment data already read;

correcting the address hash value when a given segment data already read is deleted or when new segment data is added to the segment data already read;

correcting the pointer hash value when the given segment data already read is deleted or when the new segment data is added to the segment data already read;

writing a null value in a pre-change record for an address corresponding to said new segment data;

determining that the hierarchical database is consistent if the corrected address hash value coincides with the corrected pointer hash value;

locking a lock for said segment data already read prior to reading for determining consistency; said locking exclusively allowing either read or write;

updating, in response to split update of said segment data already read, an update history record responsive to a valid value in a read-completed address, said updating performed by first checking if said new segment data is recorded at an address higher than the read-completed address; and releasing said lock after said segment data already read is read for consistency.

2. The method of claim 1, wherein:

generating an address hash value includes summing the retention addresses of the segment data already read;

generating a pointer hash value includes summing values of the one or more pointers associated with each of the segment data already read;

correcting the address hash value includes adding a value of the retention address of the new segment data to the address hash value and subtracting a value of the retention address of the deleted segment data from the address hash value; and correcting the pointer hash value includes adding post-change values of all changed pointers to the pointer hash value and subtracting pre-change values of all the changed pointers from the pointer hash value.

3. The method of claim 1, wherein correcting the address hash value and correcting the pointer hash value occurs if the segment data already read is updated after reading one of the segment data prior to reading all the segment data.

4. A method for determining consistency in a hierarchical database, the hierarchical database including a plurality of segment data with each segment data being identified by a retention address and having one or more pointers to other segment data, the method comprising:

sequentially reading the one or more pointers of each segment data from the hierarchical database;

generating an address hash value of retention addresses of the segment data already including correcting the address hash value when a given segment data already read is updated;

generating a pointer hash value of the pointers included in the segment data already read including correcting the pointer hash value when the given segment data already read is updated;

determining that the hierarchical database is consistent if the corrected address hash value coincides with the corrected pointer hash value; and monitoring said each segment data for an update such that when said update is a change of content of said each segment data, then determining if said update is a split update or not; and if said update is not a split update, then updating an update history record; said update history record comprising a prefix update history record for recording a retention address for said each segment data, a pre-change value of a pointer to said each segment data and a post-change value of said pointer; and if said update is a split update, then updating said prefix update history record if a prefix is changed and updating a data history record responsive to a split flag.

5. The method of claim 4, wherein:

generating an address hash value includes summing the retention addresses of the segment data already read;

generating a pointer hash value includes summing values of the one or more pointers associated with each of the segment data already read;

correcting the address hash value includes adding a value of a retention address of the new segment data to the address hash value and subtracting a value of a retention address of the deleted segment data from the address hash value; and correcting the pointer hash value includes adding post-change values of all changed pointers to the pointer hash value and subtracting pre-change values of all the changed pointers from the pointer hash value.

6. The method of claim 4, wherein determining that the hierarchical database is consistent includes determining that the hierarchical database is consistent if the corrected address hash value equals the corrected pointer hash value.

* * * * *